UNITED STATES PATENT OFFICE.

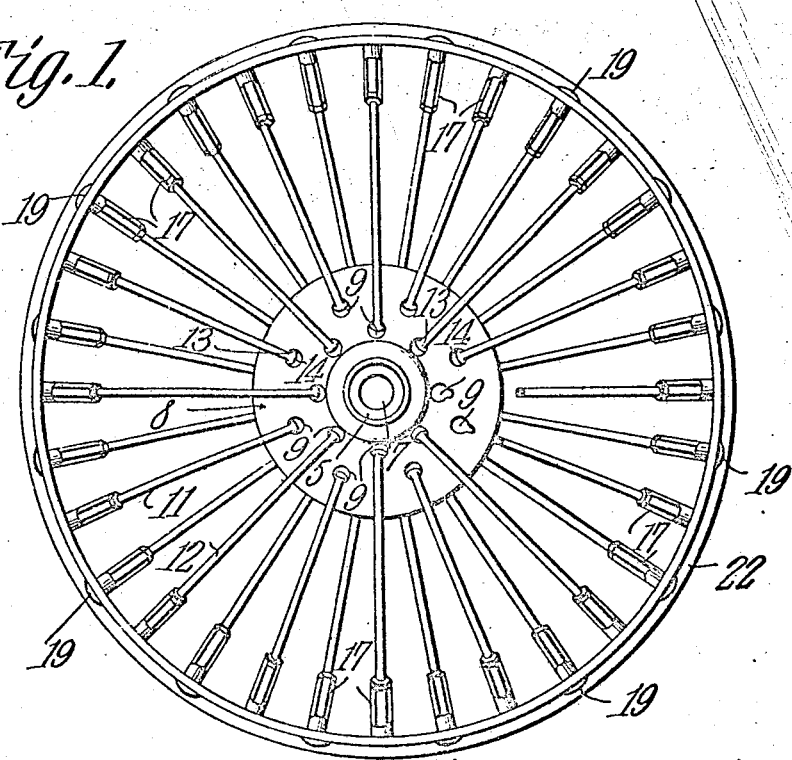
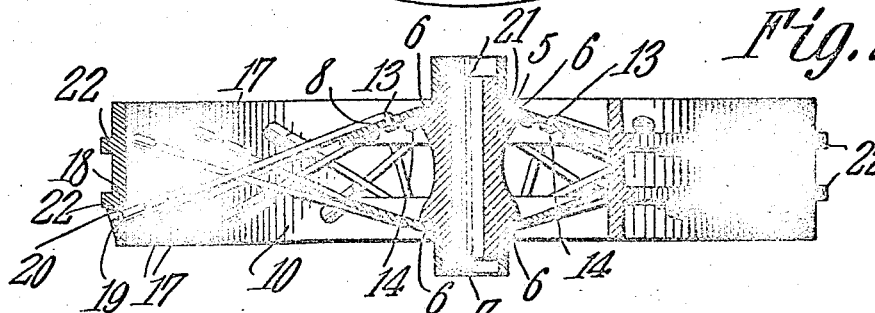

GEORGE HOHLENCAMP, OF DENVER, COLORADO.

TRACTION-WHEEL.

No. 899,047. Specification of Letters Patent. Patented Sept. 22, 1908.

Application filed October 24, 1907. Serial No. 398,986.

*To all whom it may concern:*

Be it known that I, GEORGE HOHLENCAMP, a citizen of the United States, residing at Denver, in the county of Denver and State of Colorado, have invented a new and useful Traction-Wheel, of which the following is a specification.

This invention relates to driving wheels for traction engines, threshing machines, road vehicles and the like and has for its object to provide a strong, durable and thoroughly efficient wheel of this character which will sustain a maximum load without danger of buckling or crushing the rim of the wheel.

A further object of the invention is to provide a wheel the spokes of which may be independently removed and replaced without disturbing the other spokes.

A further object is to form the hub of the wheel with oppositely disposed disks or attaching plates having radial openings disposed in staggered relation for the reception of the inner ends of the spokes, the outer ends of said spokes being counter-sunk in the rim of the wheel.

A further object is to increase the traction power of the wheel by the provision of spaced circumferential ribs which surround the rim of the wheel between the projecting ends of the spokes.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a plan view of a traction wheel constructed in accordance with my invention. Fig. 2 is a vertical sectional view of the same. Fig. 3 is an enlarged detail sectional view of a portion of the rim. Fig. 4 is a longitudinal sectional view of one of the spokes and the adjacent socket.

Similar numerals of reference indicate corresponding parts in all of the figures of the drawings.

The improved traction wheel forming the subject matter of the present invention includes a hub 5 having its opposite ends reduced to form annular shoulders 6 and provided with a transverse bore 7 for the reception of an axle.

Disposed on the opposite sides of the hub and bearing against the annular shoulders 6 are circular attaching plates or disks 8 having their inner faces concaved or dished and provided with a plurality of key hole slots 9 preferably arranged in staggered relation, as shown.

The rim 10 is connected with the hub by a plurality of spokes 11 and 12 each having one end thereof bent laterally to form an angular arm 13 terminating in an enlarged head 14 adapted to bear against the concaved face of the adjacent disk at the reduced end of the key-hole slot, as shown. The opposite end of each rod is threaded at 15 for engagement with the interiorly threaded walls 16 of the adjacent spoke socket 17. The spoke sockets 17 extend through suitable openings 18 formed in the rim 10 and are provided with enlarged heads 19 which engage counter sunk portions 20.

Attention is here called to the fact that the spokes 11 and 12 are of different lengths, the sockets of the spokes attached to one of the disks being secured to one side of the wheel rim while the sockets of the spokes on the opposite disk are secured to the other side of the rim.

The sockets 17 are provided with angular gripping faces for engagement with a wrench or other suitable tool so that by rotating said sockets the spokes may be tightened thereby to clamp the flat bearing surfaces 21 of the disks 8 in engagement with the shoulders on the hub.

Extending laterally from the tread surface of the wheel rim 10 and preferably formed integral therewith are spaced circumferential ribs 22 preferably disposed between the heads 19 of the spoke sockets and which serve to increase the traction power of the wheel and prevent slipping or skidding of the latter.

It will here be noted that the heads 19 of the sockets are disposed at an angle or inclination with respect to the tread surface of the wheel rim and are projected a short distance beyond said tread surface thereby to assist in preventing slipping of the wheel as well as to increase the traction power. It will also be noted that the heads of the sockets by engagement with the adjacent circumferential ribs 22 serve to reinforce and brace the latter. It will thus be seen that by rotating any particular spoke socket the adjacent spoke may be lengthened or shortened so as to permit the same to be readily detached from or placed in position on the wheel independently of the adjacent spokes.

A wheel constructed in the manner described is comparatively light in weight and strong and durable in construction and may be manufactured and put on the market at a comparatively small cost.

Having thus described the invention what is claimed is:

1. A wheel including a hub having oppositely disposed shoulders, attaching plates bearing against said shoulders and provided with radial openings disposed in staggered relation, and intersecting spokes of different lengths seated in said openings and secured to the rim of the wheel.

2. A wheel including a hub having oppositely disposed shoulders, attaching plates engaging said shoulders a rim spaced from the hub and provided with circumferential ribs, intersecting spokes of different lengths secured to the attaching plates and having their opposite ends extended through the wheel rim and provided with enlarged heads disposed near the circumferential ribs, and means for adjusting the spokes whereby to clamp the plates in engagement with the shoulders.

3. A wheel including a hub having oppositely disposed shoulders, a wheel rim spaced from the hub and provided with spaced circumferential ribs, there being openings formed in the wheel rim on one side of each rib and having their end walls counter sunk, attaching plates engaging the shoulders and provided with radially disposed key-hole slots, and intersecting spokes of different lengths each having one end thereof provided with a head adapted to engage the walls of the adjacent slot, the opposite ends of the spokes being extended through the openings in the wheel rim and seated in the counter sunk portions thereof.

4. A wheel including a hub having oppositely disposed shoulders, attaching plates bearing against said shoulders, a wheel rim spaced from the hub and intersecting spokes of different lengths attached to the plates and having their opposite ends extending through and projected laterally beyond the tread surface of the wheel rim.

5. A wheel including a hub having oppositely disposed shoulders, attaching plates bearing against the shoulders and having their inner faces provided with a plurality of key-hole slots disposed in staggered relation, a rim spaced from the hub of the wheel and provided with circumferential ribs, there being openings formed on one side of each rib, sockets extending through said openings and projecting beyond the tread surface of the wheel at the circumferential ribs, and spokes each having one end thereof provided with an enlarged head adapted to engage the adjacent key-hole slot, the opposite ends of said spokes being threaded for engagement with the spoke sockets.

6. A wheel including a hub, attaching plates secured to the hub, a rim spaced from said hub and provided with spaced circumferential ribs, there being openings formed in the wheel rim on one side of each rib, spoke sockets seated in said openings and provided with enlarged heads projecting beyond the tread surface of the wheel rim and disposed at an angle to the adjacent rib, and intersecting spokes of different lengths secured to the attaching plates and engaging said sockets.

In testimony that I claim the foregoing as my own, I have hereto affixed my signature in the presence of two witnesses.

GEORGE HOHLENCAMP.

Witnesses:
A. PLATTNER,
J. W. TURRISH.